United States Patent [19]

Wegener et al.

[11] Patent Number: 4,528,704
[45] Date of Patent: Jul. 16, 1985

[54] SEMI-RIGID AIR PALLET TYPE PATIENT MOVER

[75] Inventors: Jack Wegener, Preston, Md.; Raynor A. Johnson, Newark, Del.

[73] Assignee: American Industrial Research, Inc., Newark, Del.

[21] Appl. No.: 612,836

[22] Filed: May 22, 1984

[51] Int. Cl.³ .................. B65G 7/06; A47G 7/06; A47G 7/10
[52] U.S. Cl. .................................. 5/81 R; 5/453; 5/455; 180/125; 414/676
[58] Field of Search .............. 5/81 R, 81 B, 453, 454, 5/469, 423, 455; 414/676; 180/125, 124, 116; 253/93 HP

[56] References Cited

U.S. PATENT DOCUMENTS

| 3,948,344 | 4/1976 | Johnson et al. | 414/676 |
| 4,155,421 | 5/1979 | Johnson et al. | 180/125 |
| 4,272,856 | 1/1981 | Wegener et al. | 5/81 R |

Primary Examiner—Alexander Grosz
Attorney, Agent, or Firm—Sughrue, Mion, Zinn, Macpeak, and Seas

[57] ABSTRACT

An air pallet type patient mover is formed by top, intermediate and bottom thin flexible sheets of electrically conductive sheet material stitched along given lines by conductive thread to define at least a plenum chamber between the intermediate thin flexible sheet and the bottom thin flexible sheet and a semi-rigid backing member defined by the top and intermediate thin flexible sheets. Completely sealed high pressure tubes formed by the top and intermediate thin flexible sheets pressurized at relatively high air pressure may constitute the backing member for the patient mover. Alternatively, the tubes may receive low pressure low air flow prior to that air flow passing to the plenum chamber and discharging through a plurality of closely spaced small diameter pinhole type perforations opening directly into the plenum chamber and outwardly onto an underlying fixed support surface. Preferably, the perforations form a diamond shaped pattern beneath the imprint of the load. A semi-rigid sheet of a length less than the plenum chamber of an effective width less than the plenum chamber facilitates frictionless movement of a patient over a soft and depressible support surface such as that formed by a hospital bed mattress, which semi-rigid sheet overlies and encompasses the diamond shaped pattern of perforations within the bottom thin flexible sheet.

13 Claims, 5 Drawing Figures

SEMI-RIGID AIR PALLET TYPE PATIENT MOVER

FIELD OF THE INVENTION

The present invention is directed to an air pallet type patient mover and, more particularly, to a semi-rigid patient mover for facilitating the movement of patients to and from relatively soft mattresses where the mattress surface depresses to match the patient's contour and mass.

BACKGROUND OF THE INVENTION

The present invention is an outgrowth of the air pallet and air bearing patient mover development set forth in U.S. Pat. No. 3,948,344 entitled "Low Cost Air Pallet Material Handling Systems" issued Apr. 6, 1976, and U.S. Pat. No. 4,272,856 entitled "Disposable Air-Bearing Patient Mover and Valve Employed Therein" issued June 16, 1981, assigned to the common assignee. Planar air pallets of such type employ at least one flexible material bottom sheet for partially defining a plenum chamber with said one sheet being perforated as by way of small pinholes over a surface area defined by the imprint of the load which pinholes face an underlying fixed generally planar surface area, and wherein the pinholes open unrestrictedly to the interior of the plenum chamber. When the plenum chamber is pressurized by low pressure air, the escape of air under pressure through the minute perforations acts to initially jack the load above the flexible sheet and to create a frictionless air bearing of relatively small height between the underlying support surface and the bottom of the perforated flexible sheet.

In all air pallets, including patient movers, it is necessary to provide controlled pillowing of the flexible film or films which may totally or partially define the plenum chamber and to thus establish by jacking the load to a predetermined height, the ability of the air pallet to ride over surface projections on the underlying support surface. At the same time, excess pressurization of the plenum chamber may cause ballooning of the thin flexible sheet or sheets, resulting in tilting or rolling of the load off the top of the air pallet. When the load rests on the air pallet prior to pressurization of the plenum chamber, the load tends to press the perforated flexible sheet into contact with the underlying support surface (floor). This prevents the entry of air under light pressure into the plenum chamber and subsequent escape of air through the perforations to create the air bearing. Air dispersion means are required either interiorly or exteriorly of the plenum chamber or to insure pressurization of the plenum chamber, jacking of the load and subsequent creation of the air bearing.

While the air pallet type patient mover of U.S. Pat. No. 4,272,856 has operated satisfactorily, particularly in moving a patient placed thereon to and from relatively rigid underlying support surfaces, such as from an operating table to a wheeled transport table, difficulty occurs when the patient is to be moved to and from a bed whose mattress is relatively soft, and its surface is depressed so tha the deformation takes the form or contour matching the patient's body with the largest depression created by the patient's torso. It must be appreciated that a person's body is of irregular configuration in addition to the fact that the mass of the patient is also irregularly distributed. The heavy centrol torso is much heavier than the head at one end or the legs at the opposite end of that torso.

Additionally, basic to the air pallet of U.S. Pat. No. 3,948,344 is the requirement that the load constitute or be supported by a generally rigid backing member. Where such load may comprise cardboard boxes or the like, the planar bottom of such carton may constitute the generally rigid backing member or backing surface. In U.S. Pat. No. 3,948,344, where the thin flexible sheet bearing the pinhole type perforations is formed by a plastic bag or the like, the generally rigid backing member may comprise a rigid board or sheet inserted into the bag and disposed between the perforated bottom layer of the bag immediately facing the generally rigid backing member on one side and the underlying exterior and generally rigid support surface on its other side. While such rigid sheet or planar board member may operate satisfactorily under some circumstances, such an arrangement provides difficulties in air pallet type patient movers, where the patient must be moved onto or removed from a relatively soft support surface such as a hospital bed mattress having surface depressions, matching the contour of the patient and where such depressions are of irregular configuration and depth.

It is, therefore, a primary object of the present invention to provide an improved patient mover which is particularly applicable for moving the patient to and from a relatively soft and yielding support surface, such as the surface of a mattress, wherein the mass of the patient may be effectively distributed over a significant extent of the patient mover, wherein the patient mover may be readily hand grasped from either side or from either end, wherein the perforated pattern area of the thin flexible sheet facing the mattress is configured to the mass distribution of the patient carried thereby, and wherein air distribution to the plenum chamber, jacking of the patient and creation of the frictionless air film bearing are assured.

DESCRIPTION OF THE PREFERRED EMBODIMENTS

Figure 1:
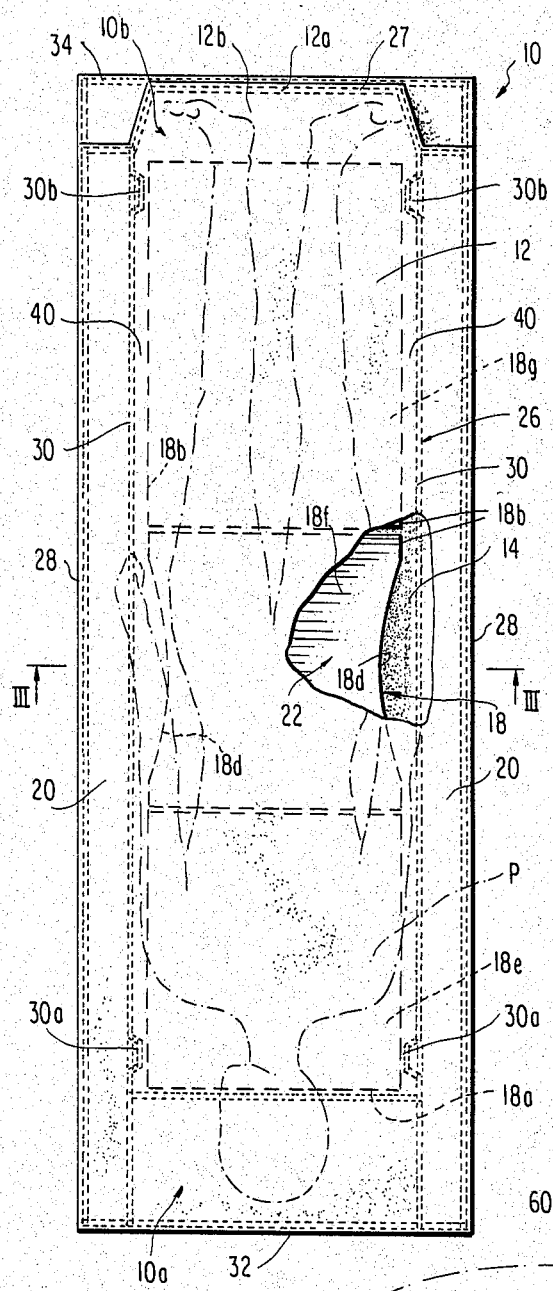
FIG. 1 is a top plan view, partially broken away, of an improved patient mover forming a preferred embodiment of the invention.
Figure 2:
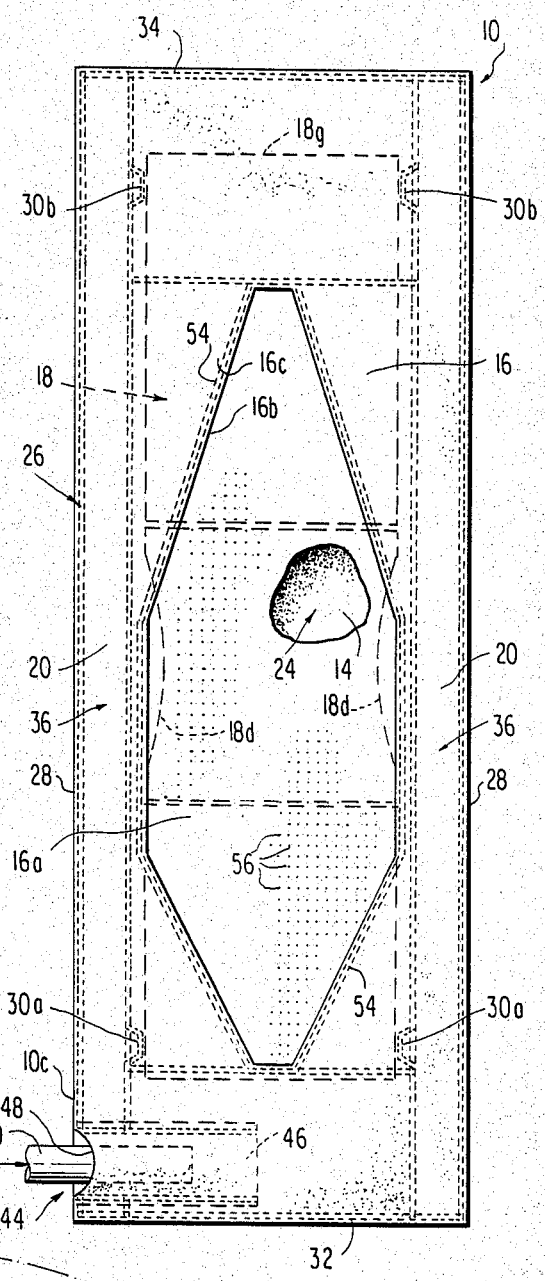
FIG. 2 is a bottom plan view, partially broken away, of the patient mover of FIG. 1.
Figure 3:
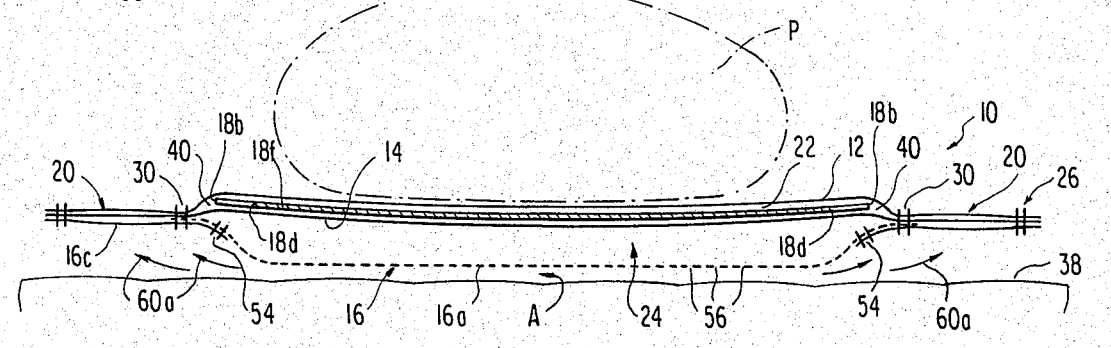
FIG. 3 is a transverse sectional view of the patient mover of FIG. 1 taken about line III—III of FIG. 1.

Referring to FIGS. 1–3 inclusive, there is shown a preferred embodiment of the present invention, indicated generally at 10. The patient mover 10 is formed principally by an upper or top, thin flexible sheet indicated generally at 12, a middle or intermediate, thin flexible sheet indicated generally at 14, and a bottom, thin flexible sheet indicated generally at 16, in addition to a semi-rigid sheet or board 18 which may be formed of plastic or the like. Thin flexible sheets 12, 14 and 16 may be formed of an electrically conductive sheet material such as that manufactured by the Herculite Corporation under the trademark "Lectrolite". This material is particularly useful in the manufacture of medical products for hospital use and is constituted by a nylon scrim with a vinyl coating on both sides thereof so as to embed the scrim within the vinyl. As such, it is impossible to have static electricity build up on the patient mover 10.

Preferably, the thin flexible sheets 12, 14 and 16 are sewn together a predetermined positions, to join the sheets and particularly to create sealed chambers or cavities. Specifically, a cavity 22, which is open at one end, is formed between the top thin flexible sheet 12 and the middle thin flexible sheet 14, while between the intermediate or middle sheet 14 and the bottom thin flexible sheet 16 there is formed a plenum chamber indicated generally at 24. The stitching, whether single or double as indicated generally at 26, is formed preferably of conductive thread such as a conductive nylon resin thread. Alternatively, the thin flexible sheets may be sealed together by the localized application of heat to thermobond the sheets along given lines, or by sewing the thin flexible sheets together, at their edges or otherwise. It should be noted, the top sheet 12 is cut off at the foot end of the patient mover along edge 12a of that member on both sides thereof to form a central tab 12b, creating recesses in that sheet. The patient mover 10 has a head end 10a and a foot end 10b. While the stitching normally goes completely through all three sheets 12, 14 and 16, at tab 12a, edge 27 of sheet 12 is free, that is, unstitched to the middle sheet 14 and bottom sheet 16, thus providing direct access to a cavity 22 between sheets 12 and 14 for insertion of the semi-rigid sheet 18 into cavity 22, at that end. It should also be noted that the semi-rigid sheet 18 is of a length which is less than the length of cavity 22 and, further, that the width of the semi-rigid sheet is less than the width of cavity 22, leaving a gap 40 of approximately one-half inch to each side of the semi-rigid sheet 18, and the sides of cavity 22 as defined by the throughstitching 30 running longitudinally of the patient mover 10. Shortening the semi-rigid sheet lengthwise insures that there is some pillowing to the plenum chamber 24 at the head end 10a of the patient mover, as will be appeciated by viewing the bottom plan view, FIG. 2.

In the simplified form shown, the plenum chamber 24 extends the complete length of the patient mover from head end 10a downwardly to foot end 10b, as defined by longitudinal stitching or seals 30 and edge seals 32 and 34, respectively, at the head end 10a and the foot end 10b of the patient mover. In order to pressurize the plenum chamber, an air inlet indicated generally at 44 is formed, for instance, in the manner of the patient mover of U.S. Pat. No. 4,272,856. It may constitute a tubular member 46 separate from and projecting internally between bottom sheet 16 and middle or intermediate sheet 14 from one lateral edge 10c of the patient mover 10. Further, the bottom sheet 16 may be provided with an arcuate cutout as at 48, FIG. 2, while the intermediate sheet 14 has no cutout, and throughout, edge of the arcuate cutout 48, is free of, that is, not sealed to, the bottom sheet so as to permit the insertion of a tubular wand as at 50 into the air inlet 44 such that the rush of air enters the plenum chamber at the top or head end, above the head end edge 18a of the semi-rigid sheet 18 constituting the backing member of the air pallet type patient mover and causing that portion of the plenum chamber to initially pillow and expand prior to air distribution throughout the length of the plenum chamber 24.

In the illustrated embodiment of FIGS. 1–3 inclusive, the portion of the thin flexible bottom sheet 16 which is perforated is illustrated as at 16a, and in this case, there is a modified diamond shaped cutout in that sheet as at 16b within which is positioned a modified diamond shaped piece of thin flexible sheet material which may be identified to that as at 16c, of a slightly larger size so as to overlap slightly cutout 16b, and to which it is sewn at its edges by double stitching as at 54, completely about the cutout 16b. Insert bottom sheet piece 16c bears thousands of small pinhole-sized perforations as at 56, in the manner of U.S. Pat. No. 3,948,344 and 4,272,856, through which pinholes the air escapes from the plenum chamber 24 to form the air bearing indicated generally at A, FIG. 3. The air escaping from the plenum chamber tends to pass outwardly of the perforations 56, momentarily captured in the narrow space between the bottom thin flexible sheet 16 of the patient mover and the top surface 38 of the mattress prior to escape therefrom as indicated by arrows 60a.

The perforations 56 are noted as underlying the semi-rigid sheet 18. Particularly, the perforated pattern which may be formed in a unitary sheet 16 or in the sheet 16 as provided by stitched portions 16a and 16c, respectively, being sewn together or otherwise sealed as at 54, illustrates an arrangement wherein the major lateral area and the major number of perforations are centrally of the patient mover, i.e. providing within the widest part of the modified diamond shape pattern area of perforations 56. The pattern for the perforations 56 is of modified diamond shaped form, being octagonal, that is, constituting an eight-sided figure although not a regular octagon. The perforation pattern is preferably polygonal and may be six-sided, eight-sided or the like, and preferably where the tapered portion at the foot end 10b of the patient mover is considerably longer than that of the corresponding head end.

It is important to appreciate the effectiveness of the gaps 40 between the side edges 18b of the semi-rigid sheet 18 constituting the planar backing member of the air pallet type patient mover the sides of cavity 22 providing the flexibility sufficient to produce pillowing of bottom thin flexible sheet 16 inwardly of laterally spaced longitudinally extending stitching 30. Stitching 30 seals off handhold areas 36 from the pressurized plenum chamber 24 of the patient mover 10. Due to the fact that the smi-rigid sheet 18 is narrower than the later distance between stitching 30 partially defining plenum chamber 24, the air is not shut off along the sides of the plenum chamber due to the mass of the patient pressing downwardly on the semi-rigid sheet 18 and tending to close off the plenum chamber. Air in passing along both sides of the plenum chamber 24 flows to the lower end of the plenum chamber 24 at the foot end 10b of the patient mover 10 and acts all around the patient P to lift the semi-rigid plastic sheet 18 starting from the head end 10a to the patient mover in the direction of the foot end 10b in the manner of U.S. Pat. No. 3,948,344 and 4,272,856, without ballooning of the thin flexible sheet and without tilting and tending to roll the patient P off the patient mover 10.

Further, as may be appreciated, in the areas internally of stitchings 30, 32 and 34 defining the plenum chamber 24, and externally of the modified diamond shaped area of perforations 56, the thin flexible bottom sheet 16 will pillow about the legs and about the shoulders and head of the patient tending to cradle the patient. This is particularly facilitated by the semi-rigid nature or semi-flexible condition of semi-rigid sheet 18. Preferably, the sheet 18 is formed of a plastic sheet material which has a preferred direction of flexing, that is, from end to end, rather than laterally from side to side, so that the semi-rigid sheet adapts to the normal contour the patient while restricting ballooning or curling around the patient, when the patient is being transported over the surface of the mattress by grasping handholds 20 defined by longitudinal stitchings 28 and 30 through all three flexible sheets 12, 14 and 16, to one side or the other of the patient mover and moving the patient laterally across the surface of the mattress and onto a waiting rigid table top for transport to an operating room, for instance.

It should be kept in mind that there are certain requirements to produce an effective patient mover capable of moving the patient across deformable surfaces such as mattresses. The perforations should underlie the semi-rigid sheet 18 only. The semi-rigid sheet 18 extends beyond perforations in some areas, in the neighborhood of the head and feet. However, the function of the sheet 18 is to distribute the load over the air bearing. In that respect, since the load is maximized at the the center of the patient over where the torso of the patient resides, the perforated area of the bottom sheet is necessarily much larger there than in the regions of the head and feet. Further, in the illustrated embodiment, the semi-rigid sheet 18 must be narrower than the plenum chamber at the hips to permit the distribution of air throughout the plenum chamber 24 when the plenum chamber 24 is being initially pressurized. Alternatively, the semi-rigid sheet 18 may have cutouts 18d within edges 18b at both sides and intermediate of its foot and head ends, as indicated in dotted lines, so as to form a dumb bell plan shape. This permits the air to pass in the regions of the recesses or cutouts and to permit full pressurization of the plenum chamber by distribution from the head end 10a holding the air inlet 44 fully to the foot end 10b of the patient mover 10. Semi-rigid sheet 18 may be sectionalized longitudinally by severing it into two or more edge abutting sections as at 18e, 18f and 18g, FIGS. 1 and 2, to facilitate folding of the patient mover 10 for transport or storage, when not in use. Sheet 18 should be more flexible longitudinally than laterally to facilitate patient transport. Bowing longitudinally actually stiffens sheet 18 against bowing laterally upwardly about the patient.

Additionally, while the width of the semi-flexible semi-rigid sheet 18 is less than the distance between longitudinal stitching 30 over a significant portion of its length, preferably that stitching is caused to move inwardly towards the center of the patient mover 10 at both ends as at 30a and 30b for the head end and foot end, respectively, of the patient mover, so as to squeeze the inserted semi-rigid sheet 18 at both ends within cavity 22 and to thereby center the sheet 18 to insure that in the vicinity of the middle of the patient mover, the flow of low pressure air from the head end of the plenum chamber 24 towards the foot end of that chamber during pressurization.

In like manner to the referred to patents, the rush of air into the plenum chamber 24 functins to jack the load, i.e., the patient, upwardly supported by the semi-rigid sheet 18 starting from the head end 10a of the patient mover in the direction of the foot end 10b. After jacking is achieved, and pillowing of the bottom thin flexible sheet 16, jacking ceases by the free exposure of some of the perforations 56 about the periphery, i.e. cutout 16b within which sheet 16c, bearing the perforations over its complete entirety, is positioned. In like manner to the prior patents, an equilibrium position is reached where the escape of air from the plenum chamber via the perforations 56 which open directly to the atmosphere rather than onto the underlying support surface, is of an such extent that the patient P and semi-rigid sheet 18 tends to move down closer to the underlying support surface. At that point some of the freely exposed perforations are then brought into immediate facing position with the underlying support surface, tending to increase the internal pressure of the plenum chamber. An equilibrium position is reached, a very thin air bearing A is maintained between the bottom thin flexible and the underlying support surface 38 of the hospital bed mattress 40.

It should be emphasized that the width of the semi-rigid sheet 18 relative to the lateral width of the cavity 22 receiving the same, the spacing between laterally opposed edges of the semi-rigid sheet 18 and/or the width of the semi-rigid sheet 18 relative to the width of the plenum chamber 24 and the lateral ends of the cavity 22, controls the pillowing of the thin flexible bottom sheet 16 partially forming the plenum chamber 24 and the jacking of the load defined by the patient P. To place it in other terms, it is the lateral play of the semi-rigid sheet 18 that controls pillowing of the underlying thin flexible bottom sheet 16 bearing the perforations 56 through which air escapes in forming the air bearing.

The pressurized air carrying wand 50 receives air from a source indicated schematically by arrow 60 as from the discharge side of a high volume, low pressure blower (not shown). The pressurized air 60 from said source escapes from the plenum chamber 24, FIG. 3, thereby forming the air bearing A between the thin flexible bottom sheet 16 and surface 38 of mattress 40, then exiting as at 60a.

Figure 4:
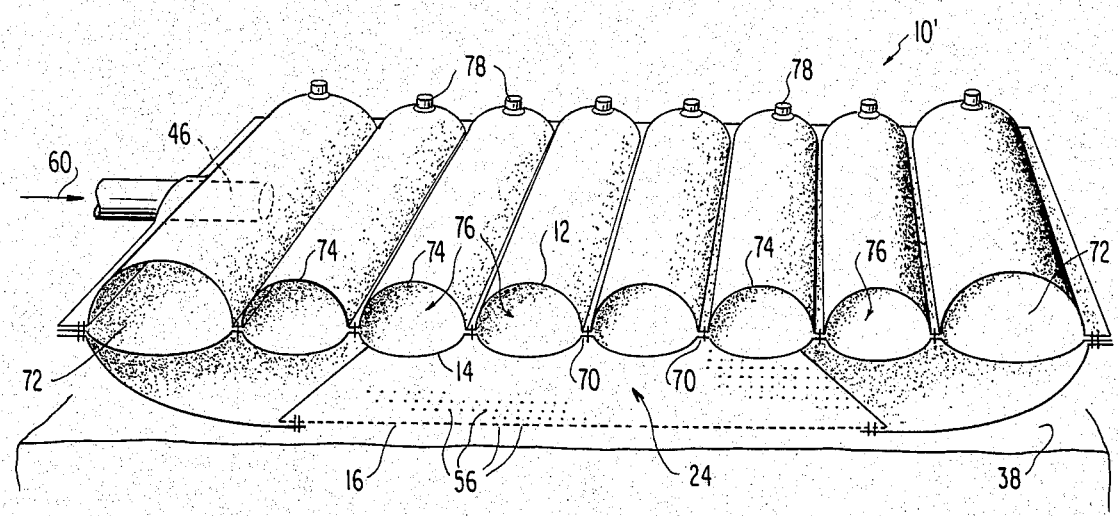
FIG. 4 is a transverse sectional view of a patient mover forming a second embodiment of the present invention.

Referring next to FIG. 4, a modified form of patient mover is shown and forms a second embodiment of the invention. The semi-rigid sheet 18 is substituted by the incorporation of a series of individual tubes into the patient mover which are sealed and subject to a high pressure fluid such as compressed air. With respect to the alternate embodiments of FIGS. 4 and 5, like elements bear like numeral designations. In FIG. 4, the patient mover, indicated generally at 10', is comprised of a thin flexible bottom sheet 16 bearing perforations over a portion of its surface area as at 56, through which air escapes from the plenum chamber 24 which is subjected to air pressurization at low pressure. The plenum chamber 24 is created by the thin flexible bottom sheet 16 and an intermediate thin flexible sheet 14. In addition, an upper thin flexible sheet 12 is sealed near its outer edges to corresponding lines near the outer edges of underlying sheets 14 and 16. In addition, it is sealed as at 70 to the intermediate or middle thin flexible sheet 14 along longitudinally extending laterally spaced lines to crease a pair of relatively large outer tubes 72, to the lateral sides of patient mover 10', and a series of smaller diameter inner tubes 74. The tubes 72, 74 are sealed not only along their longitudinal sides, but at both ends to form sealed chambers 76. These chambers may be pressurized to a relatively high pressure as at 5 to 25 psig via suitable valves such as individual inner tube type valves 78 for each chamber 76. Once pressurized by air under relatively high pressure 5 to 25 psig, the chambers 76 retain their pressure, and the patient mover takes the form much like a small raft or body surfing float seen in summer at the beach with, of course, the exception that a plenum chamber 24 underlies the series of tubes 72, 74 and is pressurized from a separate source. For instance, a source indicated by the arrow 60 cause low pressure, low CFM air to flow through an inlet tube 46 opening at the end of the thin flexible sheet 16 bearing perforations 56 and from the perforations 56 to form an air bearing. The patient P in this embodiment is cradled by the presence of the larger diameter outside tubes 72 compared to the smaller diameter interior tubes 74. The high pressure air filled tubes 72, 74 are substantially rigid, thus forming a generally rigid backing member intermediate of a patient (not shown) and the plenum chamber 24.

Turning next to FIG., 5, a third embodiment of the invention is shown, somewhat on the order of that of the embodiment of FIG. 4. In this case, the patient mover 10″ is again formed of a bottom thin flexible sheet 16 bearing perforations 56 in the manner of the prior embodiments and which forms a plenum chamber 24 between that thin flexible sheet and intermediate thin flexible sheet 14. Instead of utilizing a series of tubes or compartments formed by a top thin flexible top sheet in the manner of the embodiment of FIG. 4 which are completely sealed and separately pressurized by relatively high pressure air, the top or upper thin flexible sheet 12 which is sealed near its edges of sheets 14 and 16 as are sheets 14 and 16 to themselves, the sheet 12 is sealed at laterally spaced positions along longitudinally straight lines as at 70 in the manner of the embodiment of FIG. 4 to form a plurality of relatively large diameter tubes as at 80. The tubes individually or jointly receive a flow of low pressure, low CFM air as indicated by source 60 through inlet 46 which opens directly to the interior 82 of a transverse manifold 83 leading into the plurality of tubes 80 via tube inlets 46′, such that the low pressure, low CFM air flows into one end of each tube 80 bearing the inlet 46 to its opposite end, wherein an outlet as at 84 is formed within the middle or intermediate sheet 14 and opening directly to the plenum chamber 24 for pressurization of the same. The outlet 84 for each tube 80 should be considerably smaller than its inlet 46. The air escapes through perforations 56 to form an air bearing as at A in the manner of the prior embodiments between the bottom thin flexible sheet 16 and the underlying support surface as at 38, which again may be formed by a mattress or the like 40.

Figure 5:
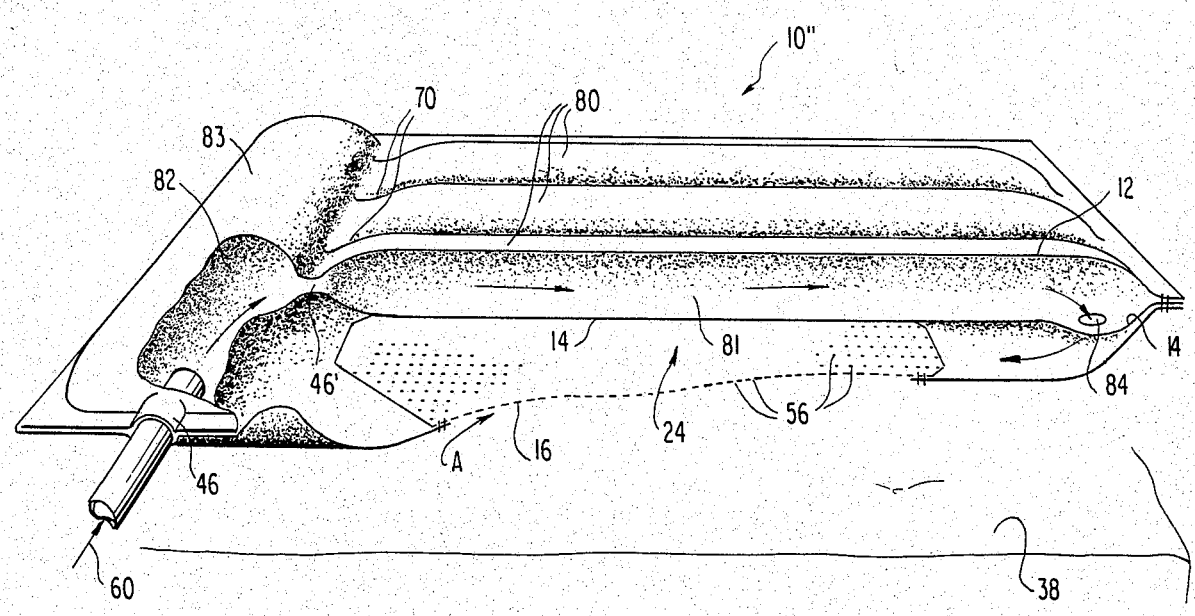
FIG. 5 is a perspective view, partially broken away, of a patient mover forming yet another embodiment of the present invention.

The structural combination of FIG. 5 is quite similar to that of the embodiment of FIG. 4 with the exception that there is no complete sealing of the tubular chambers 81 above the intermediate or middle thin flexible sheet 14 and pressurization by a separate high pressure source. However, these semi-rigid tubes 80 function to cradle the patient P lying thereon in the same manner as the prior embodiments.

It is necessary to insure the semi-rigid nature of the tubes 70 functioning to cradle the patient, the thin flexible sheet 12 may be of considerable thickness and much more rigid than thin flexible sheets 12 of the embodiments of FIGS. 1–3 inclusive and 4, respectively. As may be appreciated, the ends of the sheets 12, 14 and 16, as well as the lateral edges of the same must be sealed as by stitching in the manner of the prior embodiments, or alternatively, the sheets may be locally thermobonded. The pattern for perforations 56 for the thin flexible bottom sheets 15 in the embodiment of FIG. 4 may be identically configured to that of the first embodiment, FIGS. 1–3 inclusive. Further, while the handholds 20 are not shown in the embodiments of FIGS. 4 and 5, they may be provided as integral portions of sheets 12, 14 and 16 and fashioned in the manner of the embodiments of FIGS. 1–3 inclusive.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An air pallet type patient mover for frictionless movement of a hospital patient over a relatively soft or depressible underlying relatively fixed support surface, said patient mover comprising:
   top, intermediate, and bottom, thin flexible sheets,
   means for sealing given sheets together linearly to define a plenum chamber between said intermediate and bottom sheets, and at least one backing member cavity between said top sheet and said intermediate sheet,
   said bottom thin flexible sheet including a portion defined by the footprint of the load having a plurality of closely spaced small diameter pinhole type perforations opening directly into the plenum chamber and directly onto said support surface,
   air inlet means communicating with said plenum chamber at one end thereof for permitting low pressure air flow pressurization of the plenum chamber for initially jacking the load and for subsequent discharge through the perforations to create a thin air film between the bottom thin flexible sheet and the support surface,
   the improvement wherein said top and intermediate thin flexible sheets define a backing member cavity, and a semi-rigid sheet is carried by said backing member cavity, extending generally the length of said patient mover, and said semi-rigid sheet is of a width less than the lateral width of said plenum chamber, so as to define with the plenum chamber air dispersion means for insuring air flow throughout the plenum chamber when the air pallet is under load at the time of air pressurization of the plenum chamber and constituting with said bottom thin flexible sheet means for controlling pillowing of the thin flexible sheet material to permit jacking of the semi-rigid sheet constituting the backing member and the load, while preventing ballooning of the thin flexible sheet material,
   and wherein said semi-rigid backing member permits deflection of the patient mover somewhat to conform said patient mover to depressions within the soft depressible support surface due to the mass and contour of the patient carried thereby to permit transport of the patient via the air pallet type patient mover over said support surface.

2. The patient mover as claimed in claim 1, wherein the lateral widths of said plenum chamber and said cavity receiving said semi-rigid sheet forming said backing member are equal, and wherein sid semi-rigid sheet is of a width slightly less than that of the cavity receiving the same, such that gaps of approximately one-half inch are provided between laterally opposed edges of said semi-rigid sheet and the sides of said backing member cavity.

3. The patient mover as claimed in claim 1, wherein said perforations form a generally diamond shaped pattern underlying said semi-rigid sheet and being encompassed within the footprint of said semi-rigid backing member.

4. The patient mover as claimed in claim 3, wherein said generally diamond shaped perforation pattern is an irregular octagon.

5. The patient mover as claimed in claim 1, wherein said perforations form a generally diamond shaped pattern underlying said semi-rigid sheet and being encompassed within the footprint of said semi-rigid sheet.

6. The patient mover as claimed in claim 5, wherein said generally diamond shaped perforation pattern is an irregular octagon.

7. The patient mover as claimed in claim 1, wherein said air inlet means opens to said plenum chamber at the head end of said patient mover, and wherein said semi-rigid sheet is of a length less than that of the length of the air pallet leaving a gap between the end of said semi-rigid sheet and the head end of the patient mover to insure initial pillowing of said plenum chamber at the head end and causing progressive jacking of the backing member and the patient from the end head end of the patient mover towards the foot end thereof.

8. The patient mover as claimed in claim 1, wherein at least one of said thin flexible sheets is formed of an electrically conductive flexible sheet material.

9. The patient mover as claimed in claim 1, wherein said thin flexible sheets are formed of an electrically conductive sheet material, and said sheets are sewn together along given lines to create said edge sealed plenum chamber and said semi-rigid sheet containing cavity, respectively.

10. The patient mover as claimed in claim 9, wherein said semi-rigid sheet comprises a thin planar sheet of molded plastic having directional flexibility permitting the sheet of flex longitudinally to a significantly greater degree than laterally and to thereby conform to the patient mass distribution.

11. The patient mover as claimed in claim 1, wherein said semi-rigid sheet is of a width equal to the lateral width of the backing member cavity carrying the same, said semi-rigid sheet is of a width equal to the width of said plenum chamber, and wherein said semi-rigid sheet includes cutouts along the sides thereof at the center thereof, such that the cutouts constitute said air dispersion means for insuring air flow throughout said plenum chamber when the patient mover is under load at the time of air pressurization of said plenum chamber.

12. The patient mover as claimed in claim 1, wherein the lateral width of said backing member cavity over the major portion of its length is larger than the lateral width of said semi-rigid sheet, and wherein at the ends of said backing member cavity receiving said generally semi-rigid sheet, the lateral width of said cavity is generally equal to the lateral width of said semi-rigid sheet, such that said semi-rigid sheet is centered within said cavity to insure air dispersion throughout said plenum chamber on both sides thereof when the air pallet type patient mover is under load at the time of air pressurization of said plenum chamber.

13. The patient mover as claimed in claim 1, wherein said semi-rigid sheet is sectionalized longitudinally into at least two parts to facilitate folding of said patient mover for transport or storage when not in use.

* * * * *